United States Patent
Shah

(10) Patent No.: US 9,311,021 B1
(45) Date of Patent: Apr. 12, 2016

(54) METHODS AND SYSTEMS FOR PERFORMING A READ AHEAD OPERATION USING AN INTELLIGENT STORAGE ADAPTER

(71) Applicant: QLOGIC, Corporation, Aliso Viejo, CA (US)

(72) Inventor: Bhavik Shah, Ahmedabad (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 94 days.

(21) Appl. No.: 14/470,309

(22) Filed: Aug. 27, 2014

(51) Int. Cl.
*G06F 12/00* (2006.01)
*G06F 3/06* (2006.01)
*G06F 12/08* (2006.01)
*H04L 29/08* (2006.01)

(52) U.S. Cl.
CPC .............. *G06F 3/067* (2013.01); *G06F 3/0619* (2013.01); *G06F 3/0665* (2013.01); *G06F 3/0689* (2013.01); *G06F 12/0862* (2013.01); *G06F 2212/262* (2013.01); *G06F 2212/263* (2013.01); *H04L 67/2847* (2013.01)

(58) Field of Classification Search
CPC .............. G06F 12/0862; G06F 12/067; G06F 12/0665; G06F 12/0689; G06F 2212/263; H04L 67/2847

See application file for complete search history.

(56) References Cited

U.S. PATENT DOCUMENTS

| 2014/0013027 A1* | 1/2014 | Jannyavula Venkata ............. G06F 12/0866 711/103 |
| 2015/0143023 A1* | 5/2015 | Rostoker ............. G06F 12/0246 711/103 |

\* cited by examiner

*Primary Examiner* — Shawn X Gu
(74) *Attorney, Agent, or Firm* — Klein, O'Neill & Singh,LLP

(57) ABSTRACT

Methods and systems for a read ahead operation are provided. The method includes maintaining a data structure by an adapter to track whether data blocks associated with a logical unit number (LUN) have been written or modified; extracting a starting logical block address (LBA) for executing a read request for reading data stored using the LUN; generating a LBA range for a read ahead operation that is used to predict data that may be read subsequent to the read request; determining if blocks associated with the LBA range for the read ahead operation have been written or modified; only reading ahead the blocks associated with the LBA range, when the blocks have been written to or modified; and temporarily storing the read ahead data at a cache LUN maintained by the adapter.

21 Claims, 6 Drawing Sheets

METHODS AND SYSTEMS FOR PERFORMING A READ AHEAD OPERATION USING AN INTELLIGENT STORAGE ADAPTER

TECHNICAL FIELD

The present disclosure relates to storage systems and more particularly to intelligent storage adapters used for read ahead operations.

BACKGROUND

A computer network, often simply referred to as a network, is a group of interconnected computers and devices that facilitates communication among users and allows users to share resources. Adapters, switches and other devices are typically used during network communication for reading and writing data at mass storage devices.

Computing devices (or systems) use mass storage devices to store data. Data centers are commonly used to store large amount of data for computing devices. Different storage options are available for computing devices to store data and retrieve data. For example, direct-attached storage (DAS), network attached storage (NAS) and storage area networks (SANs).

A DAS system typically includes a plurality of storage drives that are directly attached to a computing device (for example, a server) and is accessible via a host bus adapter (HBA). Common protocols used for DAS storage devices are SCSI (Small Computer Systems Interface), ATA (AT attachment), SATA (Serial ATA), SAS (Serial Attached SCSI) and others.

NAS is a file level storage that provides access to a plurality of computing devices. NAS typically uses network file sharing protocols, for example, NFS (Networked File System), CIFS (Common Internet File System) and others for storing and managing data at storage devices.

SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often utilize a Fibre Channel fabric topology, an infrastructure specially designed to handle storage communications. SANs may also use iSCSI (i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet) and other protocols for storing data at storage devices.

Continuous efforts are being made to better provide access to storage systems and improve how data is stored and retrieved in a network environment having a plurality of computing devices.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts:

FIGS. 2B-3 show process flows according to various embodiments of the present disclosure.

DETAILED DESCRIPTION

Figure 1A:
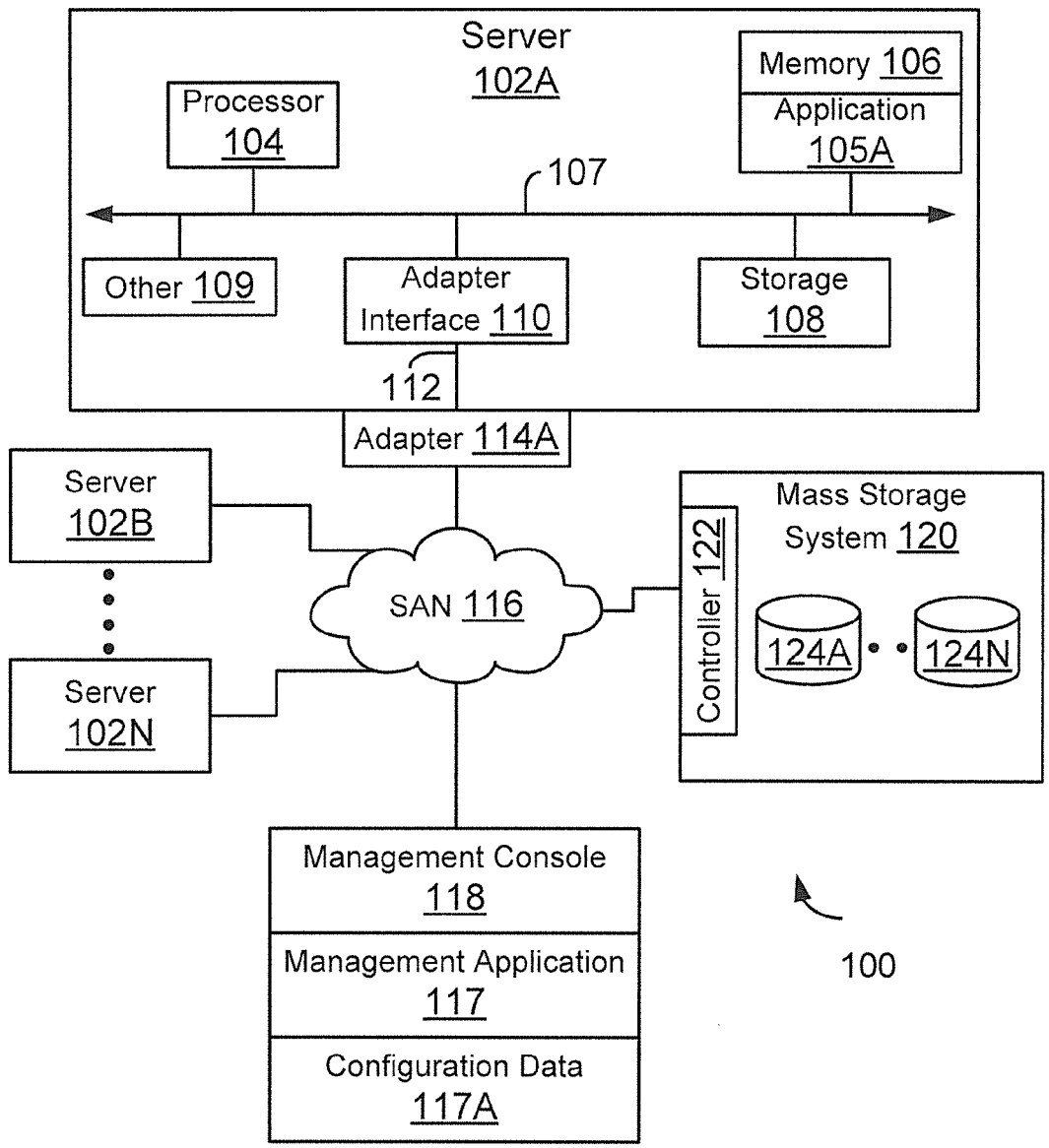
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer" "system," and "functionality" represent executable instructions that perform specified tasks when executed on a hardware based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one embodiment, an adapter, for example, a network device is provided. The adapter includes a storage protocol controller having a port for interfacing with a storage area network (SAN) based storage device and another adapter operating within a cluster is provided. The adapter includes a processor executing instructions for managing a local storage device that is configured to operate as a caching device for a computing device. The adapter operates as a host bus adapter and a storage controller for managing storage space at the local storage device and the SAN-based storage device.

System 100: FIG. 1A is a block diagram of a system 100 configured for use with the present embodiments. System 100 may include a plurality of computing systems 102A-102N (which may also be referred to as server(s) 102 or host system(s) 102), each coupled to an adapter, as illustrated herein by server 102A and adapter 114A (also referred to as an ISA 114A) that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture bus, a SCSI bus, a universal serial bus (USB), an Institute of Electrical and Electronics Engineers (IEEE) standard 1394 bus (sometimes referred to as "Firewire"), or any other type of bus.

The computing system 102A may further include a storage device 108, which may be for example a hard disk (HDD), a solid-state drive (SSD), a hybrid drive (sometimes referred to as SSHD), a CD, DVD, or Blu-Ray drive, a non-volatile memory device (flash or memory stick) or any other storage device for storing structured or unstructured data. Storage 108 may store operating system program files (or data containers) and/or application program files, for example, email applications, database applications, management applications, and other application files. Some of these files are stored on storage 108 using an installation program. For example, the processor 104 may execute computer-executable process steps of an installation program so that the processor 14 can properly execute the application program.

In one embodiment, storage device 108 may be a SSD. SSDs are becoming popular for servers that may need to store large amounts of data with relatively quick access. ISA 114A described below in more detail may be used to manage and/or access storage device 108, according to one embodiment.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In an embodiment, processor 104 may execute an application 105A for performing certain functions. For example, application 105A may be a database application, a virtual machine executed in a virtual environment (provided by VMware Corporation, Microsoft Corporation or any other entity), an electronic email application (for example, Microsoft Exchange), or any other application type. Application 105A may issue read and write requests that are processed by ISA 114A, as described below in more detail. Application 105A may also be referred to as a "client."

The computing system 102A also includes other devices and interfaces 109, which may include a display device interface, a keyboard interface, a pointing device interface and others. The details of these components are not germane to the inventive embodiments.

ISA 114A may be configured to handle both network and storage traffic while interfacing with other elements. In one embodiment, as described below in detail, ISA 114A may be configured to provide the functionality of a host bus adapter (HBA) by providing connectivity to SAN-based storage arrays, as well as, present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates that are greater than 1 gigabit (GB). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel (or FC) is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol. In one embodiment, ISA 114A can be configured to operate as a FCOE adapter. Those of ordinary skill in the art will appreciate, however, that the present embodiments are not limited to any particular protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, ISA 114A may operate as an initiator as well as a target for responding to input/output (I/O or IO) requests for reading and writing information at storage devices.

Storage space at a storage device (local or SAN-based) is typically presented to application 105A as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105A to read and write data to storage locations. The LBAs are mapped with actual physical storage to read and write data. A LUN used by an application may be referred to as a data LUN. A LUN that is accessible via a SAN connection may be referred to as a SAN LUN. A LUN at a local storage device managed by ISA 114A may be referred to as "cache" LUN. A cache LUN may be used to cache data stored at a SAN LUN or another data LUN. The cache LUN is managed by ISA 114A and may not be visible to application 105A.

Referring back to FIG. 1A, computing system 102 uses an adapter interface 110 to communicate with ISA 114A via a link 112. In one embodiment, link 112 may be a PCI-Express link or any other interconnect type. The adaptive embodiments disclosed herein are not limited to any particular link type.

ISA 114A may communicate and interface with a mass storage system 120 via a SAN 116 that may include one or more switch(es) (which also may be referred to as fabric switches). The mass storage system 120 may include a plurality of storage devices 124A-124N. Storage space at storage devices 124A-124N may be presented as SAN LUNs to application 105A via SAN 116. Controller 122 of mass storage system 120 may be used to manage storage devices 124A-124N. In one embodiment, controller 122 may include a processor, an ISA 114A and other similar components.

System 100 may also include a management console 118, used according to one embodiment. Management console 118 may be a computer system similar to computing system 102A described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure 117A at a storage location.

In one embodiment, ISA 114A is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114A may configure a LUN from the local storage 108 and present the LUN to servers 102A-102N, allowing the local storage 108 to be shared by other Servers 102B-102N.

In another embodiment, ISA 114A provides traditional SAN connectivity to computing systems 102A and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local SSDs for read and/or write caching.

Figure 1B:
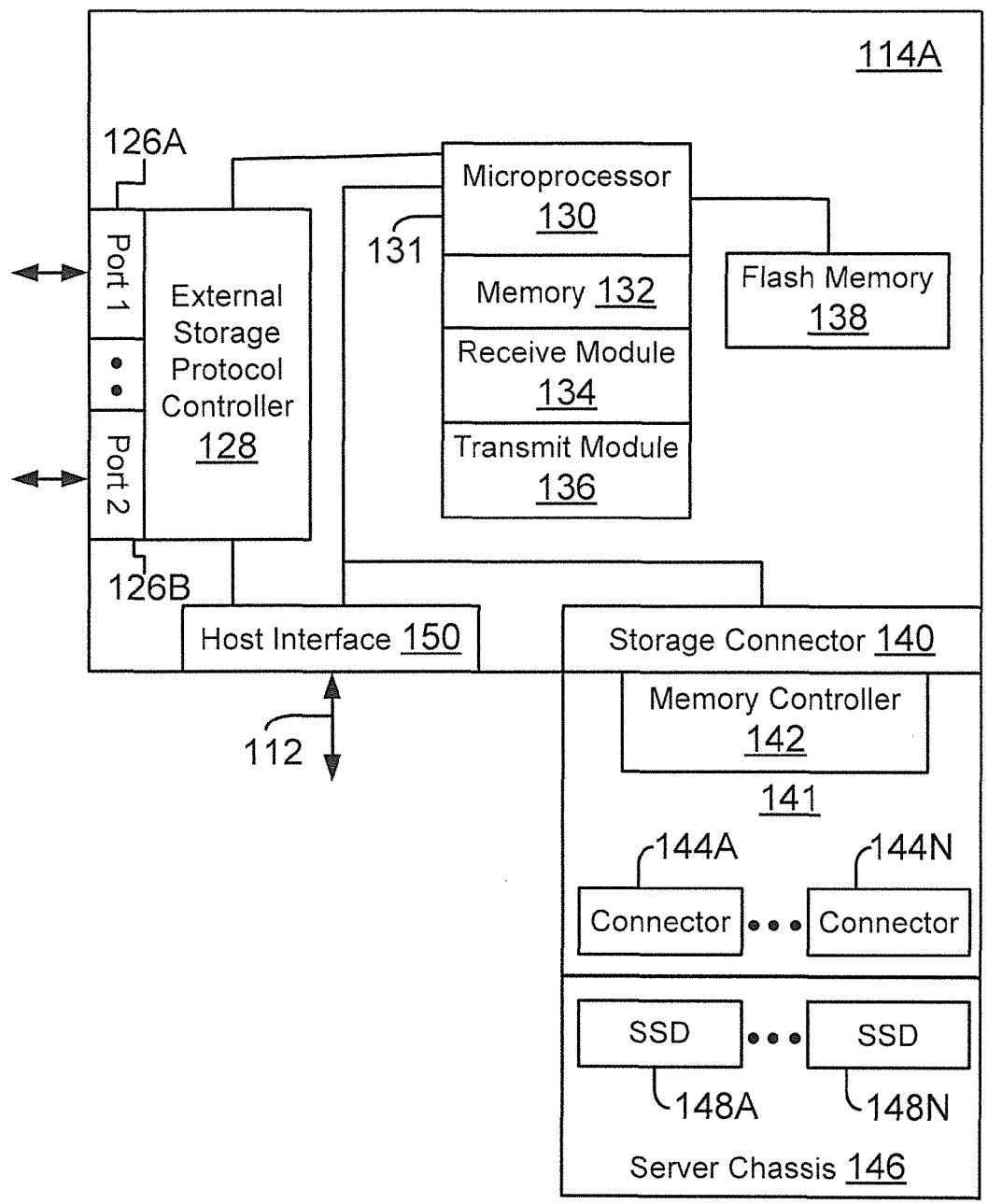
FIG. 1B shows an example of an intelligent storage adapter (ISA)

FIG. 1B shows an example of ISA 114A that includes a storage protocol controller 128 (shown as "external storage protocol controller") with ports 126A and 126B. The storage protocol controller may be a Fibre Channel controller (or application specific integrated circuit (ASIC)) used for interfacing with Fibre Channel based storage devices via ports 126A/126B. In such an embodiment, ports 126A/126B include logic and circuitry for sending and receiving Fibre Channel frames. Fibre Channel is simply shown as an example and the various embodiments disclosed herein are not limited to any particular storage/network protocol. Thus ports 126A-126B are not limited to just Fibre Channel ports. Furthermore, although only two ports 126A and 126B are shown as an example, the adaptive embodiments disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one embodiment, storage protocol controller 128 includes a processor (not shown) for executing the Fibre Channel stack having layers, FC0 -FC4. FC0 is defined by the Fibre Channel specification as the physical layer, which includes cables (fiber optics, twisted-pair), connectors and others. The FC1 layer is defined as the data link layer. This layer implements the 8B/10B encoding and decoding of signals. The FC2 layer is defined as the network layer. This layer defines the main Fibre Channel framing, addressing, and control protocols. The FC3 layer is an auxiliary layer that provides common services like encryption or RAID related. The FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 will depend on the type of connection/interconnect used to communicate with processor 104. For example, if a PCI-Express link is used to communicate with processor 104, then host interface 150 includes logic and circuitry for receiving and sending PCI-Express packets/information.

ISA 114A further includes a system-on-chip (SOC) 131 that includes a processor 130 having access to an adapter memory (which may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various embodiments described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by processor 130 for executing the instructions described below in detail. ISA 114A also includes a storage connector 140 that interfaces with another card 141 (may also be referred to as a daughter card 141), according to one embodiment. In one embodiment, the storage connector may be a PCI-Express connector, PCI connector or any other connector type based on the interconnect used by SOC 131 to interface with the SSDs. The daughter card 141 includes a memory controller 142 that interfaces with a plurality of connectors' 144A-144N. The plurality of connectors' 144A-144N are used to plug in, for example, SSDs 148A-148N (similar to storage 108). In this embodiment, SSDs 148A-148N are included within a server chassis 146. In one embodiment, connectors' 144A-144N may be SATA connectors for receiving SSDs 148A-148N. In another embodiment, connectors' 144A-144N may be SAS connectors. In other embodiments, any or all of the SSDs 148 may be replaced with other storage options as described herein with reference to storage 108.

ISA 114A has SAN connectivity because of ports 126A-126B, similar to a host bus adapter, as mentioned above. The storage protocol controller 128 allows SAN storage-based processing. Unlike conventional HBAs, ISA 114A also includes a storage connector 140 that provides local storage solutions via SSDs 148A-148N.

In another embodiment, ISA 114A is configured such that a daughter card has the SSDs 148A-148N on the card itself rather than on the server chassis 146. In another embodiment, ISA 114A is configured such that the memory controller 142 is on the same card as the other components of ISA 114A. The SSDs 148A-148N are also on the same card connected via one or more storage connectors.

Figure 1C:
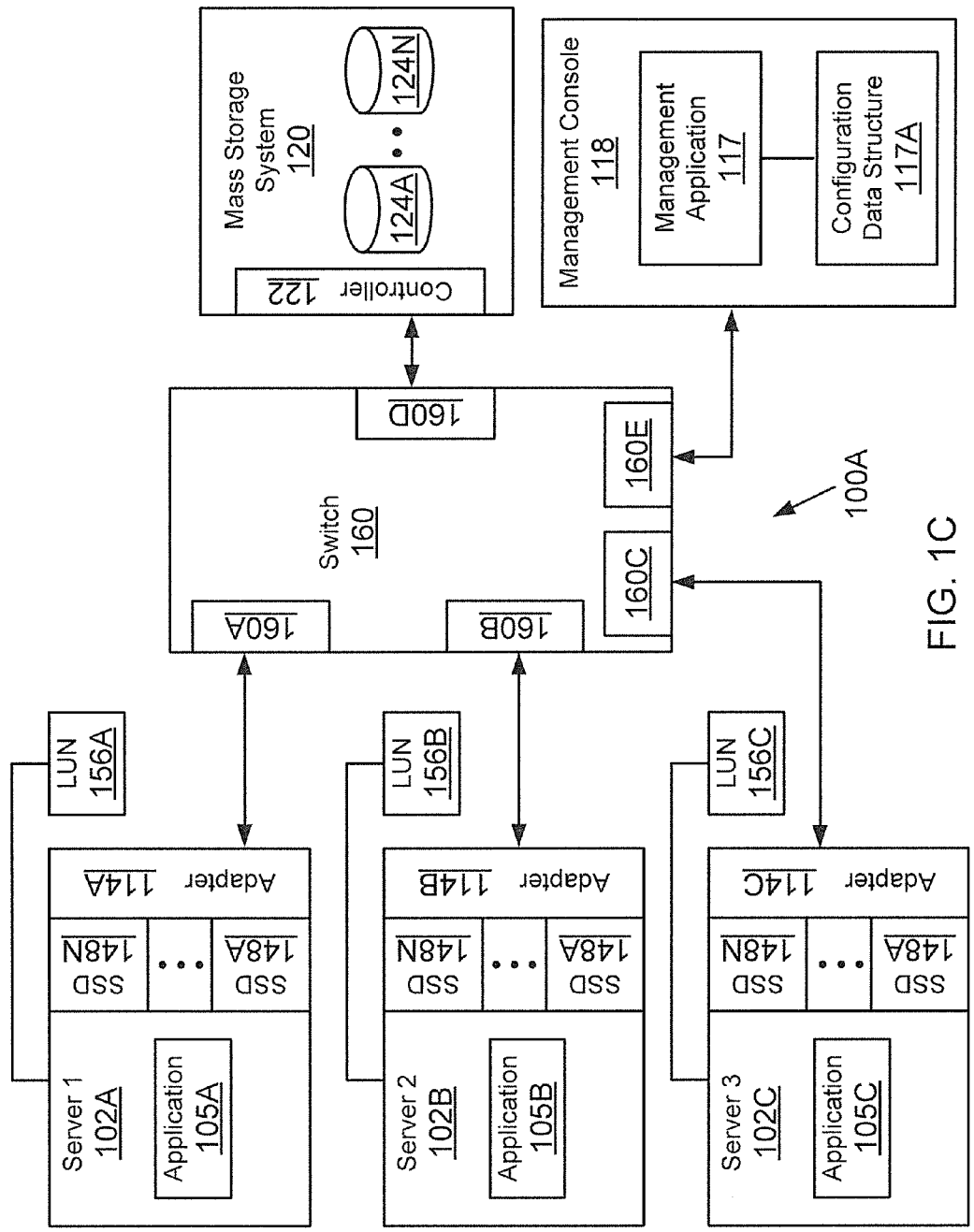
FIG. 1C shows an example of a configuration for using the ISAs, according to one embodiment.

FIG. 1C shows a system 100A where each ISA 114A-114C in servers' 102A-102C are coupled to a fabric switch 160, according to one embodiment. ISA 114B and 114C are similar to ISA 114A described above. Fabric switch 160 that is a part of SAN 116 (shown in FIG. 1A) includes a plurality of ports 160A-160E. Ports 160A-160C are coupled to ISA 114A-114C ports, respectively, while port 160D is coupled to controller 122 of the mass storage system 120. Management console 118 may be coupled to port 160E for configuring various components of system 100A.

Management console 118 may be used to configure LUNs 156A-156C that are presented to application 105A executed by server 102A, application 105B executed by server 102B, and application 105C executed by server 102C for storing information. The LUNs may be based on storage located at SAN-based storage 120 or at a local SSD 148A-148N.

The LUNs 156A-156C may also be configured to operate as a local LUN. In this configuration, the LUN may be used as a "boot" LUN. The LUN may be used by the host computing system to which it is presented. One or more ISAs may present the boot LUN to any of the servers that are served by a cluster of ISAs.

The LUNs 156A-156C may also be accessible by one or more servers via switch 160. In this example, a DAS-based SSD becomes accessible as SAN storage, while the DAS-based storage is still managed by an application 105A (for example, a database application).

In one embodiment, ISAs 114A-114C operate within a cluster. The cluster is configured using management application 117. The cluster is identified by a unique identifier. Within the cluster, a specific ISA may operate as a LUN owner or a "cache owner." The cache owner adapter interfaces with the SAN LUN for executing read and write operations. As an example, adapter 114A may be the cache owner for LUN 156A that is presented to application 105B. In this configuration, ISA 114B becomes the client ISA or the client adapter.

In one embodiment, a SAN LUN may be cached using SSD 148 managed by ISA 114A. Storage space at SSD 148 may be used to operate as a "Read Ahead" cache for the SAN LUN. This means that when a request to read data stored at a SAN LUN is received, then a read ahead process predicts what other LBAs may be read next. This allows the system to retrieve the data before it is requested. The "read ahead" data is then stored at the local cache that is based on SSD 148.

Conventional read ahead techniques have shortcomings. For example, when the read ahead process predicts certain blocks and those blocks were never written, then attempting to read unwritten blocks can be a waste of computing resources because a read ahead request for unwritten blocks will only return zeroes. The embodiments disclosed herein use an efficient technique to track what blocks may have been written and only read ahead the written blocks, as described below in detail.

Figure 2A:
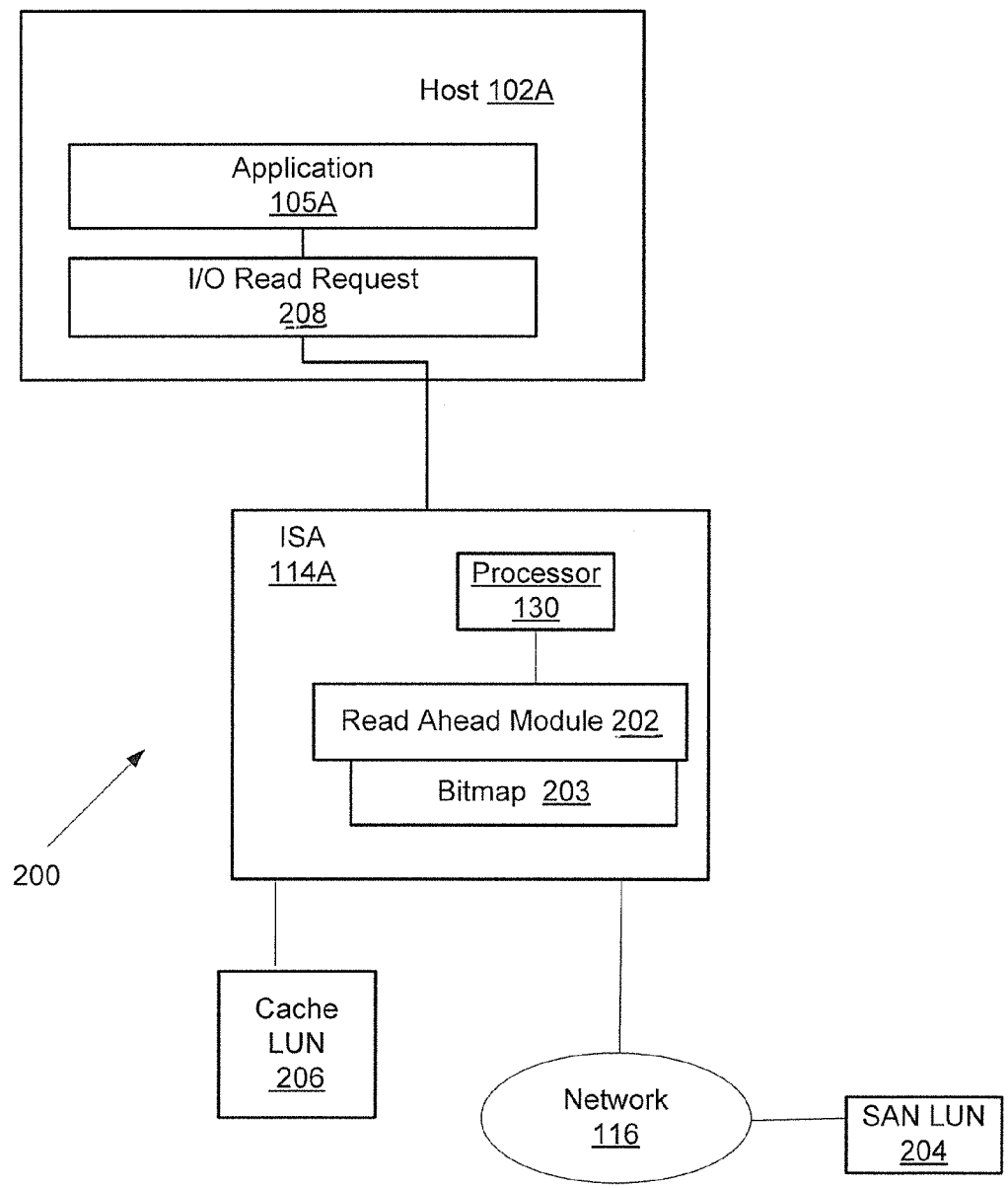
FIG. 2A shows an example of a system for a read-ahead process, according to one embodiment.

FIG. 2A shows an example of system 200 using a read ahead module 202 executed by processor 130 of ISA 114B, according to one embodiment. The read ahead module 202 may stored as processor executable memory by ISA 114A. The read ahead module 202 is used for reading ahead blocks of data from SAN LUN 204 into the cached LUN 206 that is based on storage space at SSDs 148 and managed by ISA 114A. The SAN LUN 204 is based on a SAN based storage device 124.

Application 105A executed by host system 102A generates an I/O request 208 that is provided to or obtained by ISA 114A. Based on the I/O READ request, the read ahead module 202 predicts a block address range (LBA range) that the read ahead module 202 believes application 105A will need next. This prediction may be based on various factors, for example, the read ahead process will generate READs for an adjacent LBA range to the LBA range specified in the I/O read request. For example, if a READ I/O request is for 4KB data, then the read ahead module 202 generates a request for a total of 32KB of data covering data blocks that are adjacent to the requested data blocks. This helps applications which have sequential IO patterns such as background database maintenance of a Microsoft Exchange server.

The read ahead module 202 uses a bitmap (or data structure) 203 to filter or reduce the predicted block address range, as described below in detail. Bitmap 203 tracks blocks that are written for a LUN (for example, SAN LUN 204). As an example, bitmap 203 may store the following information: SAN LUN identifier that identifies the SAN LUN, block number that identifies the logical block address and a bit value indicating if the block has been modified i.e. written or not.

Figure 2B:
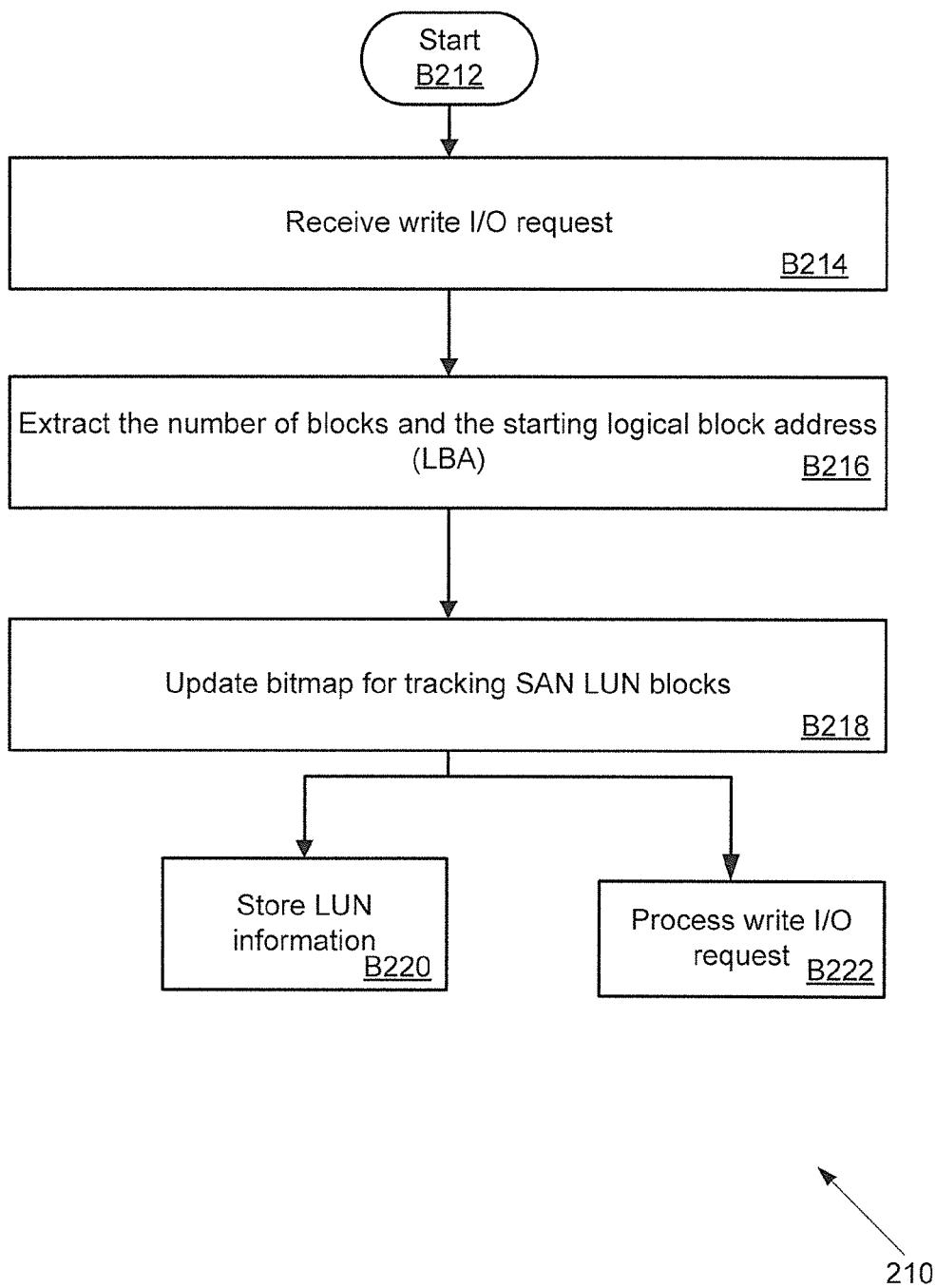

FIG. 2B shows a process 210 for handling write I/O requests, according to one embodiment. The process starts in block B212, when host 102A and an ISA (for example, 114A) are operational. In block B214, when ISA 114A receives an I/O request to write data either from application 105A or another peer ISA operating within a cluster. The write request may be to write to SAN LUN 204 (FIG. 2A).

In block B216, ISA 114A extracts the number of blocks that need to be written and the starting LBA for the write operation. The LBA in this instance is for the SAN LUN.

In block B218, ISA 114A determines if the blocks in the extracted range have previously been modified for the LUN. If the blocks have not been modified, then the bitmap 203 is updated. As described above, bitmap 203 tracks the blocks for the SAN LUN as they are written. Thereafter, in block B220, the bitmap information may be stored persistently at a storage device. When the blocks that are in use for the LUN are freed, then bitmap 204 is updated to reflect that blocks are no longer in the "modified state". The write I/O request is also processed in block B222. If the write I/O request is to be cached locally, then it is saved at a local cache, otherwise saved at the SAN LUN 204.

Figure 3:
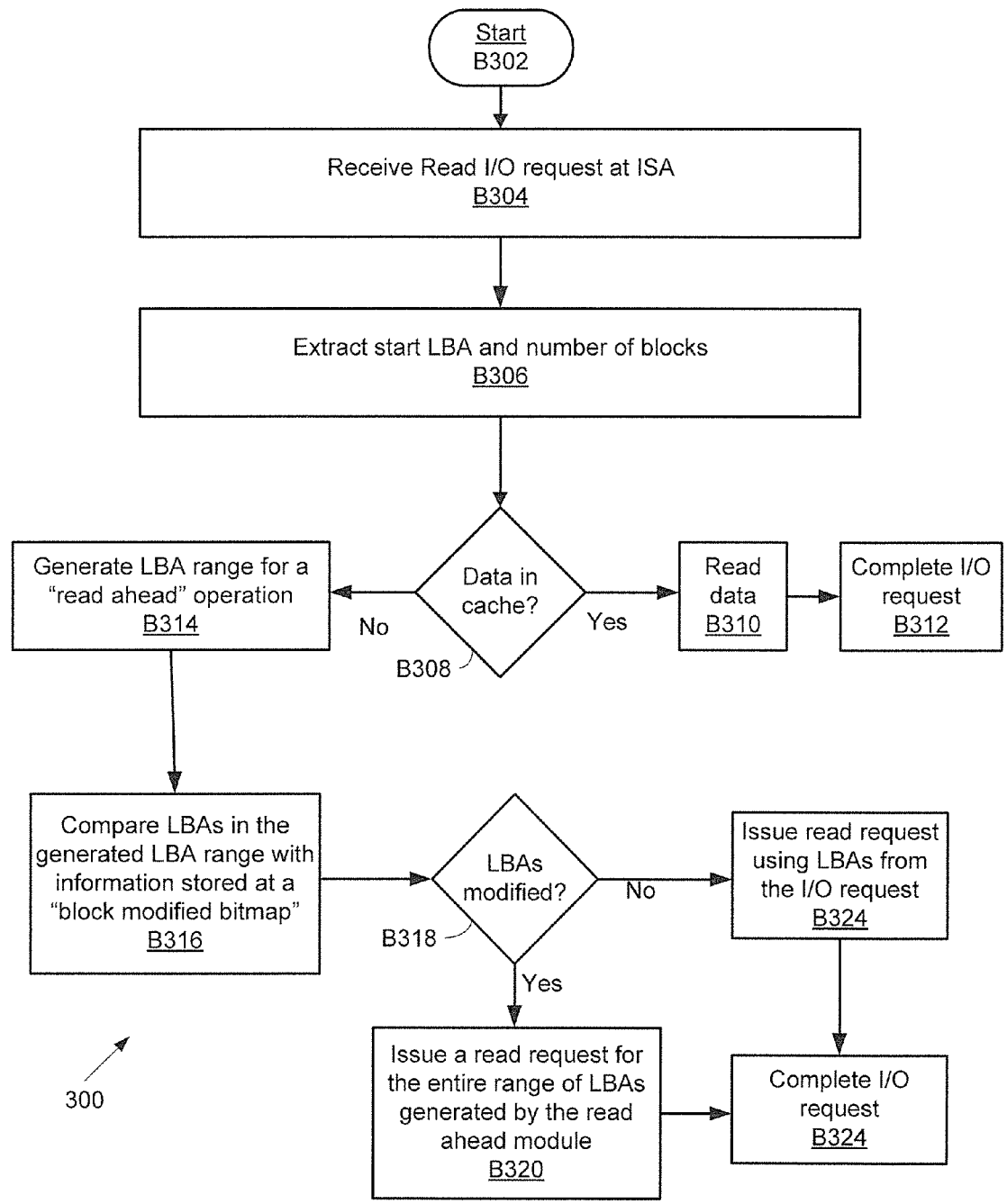

FIG. 3 shows a process 300 for handling a read request and using the read ahead module 202, according to one embodiment. The process begins in block B302, when application 105A at host system 102A is initialized and operational. ISA 114A is also operational.

In block B304, a read I/O request is received at ISA 114A. The read request includes a starting LBA for the SAN LUN and a number of blocks that have to be read. In block B306, the starting LBA and the number of blocks are extracted by ISA 114A.

In block B308, the ISA 114A determines if the data for the address range in the I/O request is at cache 206. If yes, then the data is read from the cache in block B310 and the I/O request is completed in block B312.

If the data is not in the cache 206, then in block B314, the read ahead module 202 predicts a LBA range that is greater than the LBA range in the I/O request for a read ahead operation. As described above, the read ahead address range is predicted based on adjacency.

In block B316, the ISA 114B compares the additional block addresses with the block addresses at bitmap 203 to determine if any data has been written at the blocks for the read ahead process.

In block B318, the read ahead module 202 determines if additional LBAs have been modified i.e. if data has been written at the additional block addresses. If yes, then a read request for the entire predicted range is generated to read ahead the data from the predicted LBA range. Thereafter the process ends in block B324, when the I/O request is completed.

If the additional LBAs were not modified, then in block B322, a read request is issued using only the LBA range in the I/O request. Thus, the read ahead process does not attempt read ahead blocks that have not been written or modified. The I/O request is then completed in block B324, as described above.

The processes described above are efficient for reading ahead cached information. The processes read ahead data when data has actually been written or modified at the LBA ranges that are adjacent to an LBA range specified in a read I/O request.

Although the present disclosure has been described with reference to specific embodiments, these embodiments are illustrative only and not limiting. For example, although the description above has been described with respect to an ISA, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine implemented method, comprising:
   maintaining a data structure by an adapter to track whether data blocks associated with a logical unit number (LUN) have been written or modified;
   extracting a starting logical block address (LBA) for executing a read request for reading data stored using the LUN;
   generating a LBA range for a read ahead operation that is used to predict data that may be read subsequent to the read request;
   determining if blocks associated with the LBA range for the read ahead operation have been written or modified;
   only reading ahead the blocks associated with the LBA range, when the blocks have been written to or modified; and
   temporarily storing read ahead data at a cache LUN maintained by the adapter.

2. The method of claim 1, wherein the LUN is based on storage space at a storage device that is accessible via a storage area network (SAN).

3. The method of claim 1, wherein the cache LUN is based on storage space at a local solid state storage device that is managed by the adapter.

4. The method of claim 1, wherein the adapter maintains a bitmap for tracking blocks associated with the LBA range that may have been written or modified.

5. The method of claim 1, wherein the blocks associated with the LBA range are not read if the blocks have not been written to or modified.

6. The method of claim 1, wherein LBA range for the read ahead operation is greater than an LBA range of the read request.

7. The method of claim 1, wherein the entire LBA range is read ahead if any block within the LBA range has been written to or modified.

8. A non-transitory, machine readable storage medium storing executable instructions, which when executed by a machine, causes the machine to perform a method, the method comprising:
   maintaining a data structure by an adapter to track whether data blocks associated with a logical unit number (LUN) have been written or modified;
   extracting a starting logical block address (LBA) for executing a read request for reading data stored using the LUN;
   generating a LBA range for a read ahead operation that is used to predict data that may be read subsequent to the read request;
   determining if blocks associated with the LBA range for the read ahead operation have been written or modified;
   only reading ahead the blocks associated with the LBA range, when the blocks have been written to or modified; and temporarily storing read ahead data at a cache LUN maintained by the adapter.

9. The storage medium of claim 8, wherein the LUN is based on storage space at a storage device that is accessible via a storage area network (SAN).

10. The storage medium of claim 8, wherein the cache LUN is based on storage space at a local solid state storage device that is managed by the adapter.

11. The storage medium of claim 8, wherein the adapter maintains a bitmap for tracking blocks associated with the LBA range that may have been written or modified.

12. The storage medium of claim 8, wherein the blocks associated with the LBA range are not read if the blocks have not been written to or modified.

13. The storage medium of claim 8, wherein LBA range for the read ahead operation is greater than an LBA range of the read request.

14. The storage medium of claim 8, wherein the entire LBA range is read ahead if any block within the LBA range has been written to or modified.

15. A system comprising:
a processor executing instructions out of a memory for:
maintaining a data structure by an adapter to track whether data blocks associated with a logical unit number (LUN) have been written or modified;
extracting a starting logical block address (LBA) for executing a read request for reading data stored using the LUN;
generating a LBA range for a read ahead operation that is used to predict data that may be read subsequent to the read request;
determining if blocks associated with the LBA range for the read ahead operation have been written or modified;
only reading ahead the blocks associated with the LBA range, when the blocks have been written to or modified; and
temporarily storing read ahead data at a cache LUN maintained by the adapter.

16. The system of claim 14, wherein the LUN is based on storage space at a storage device that is accessible via a storage area network (SAN).

17. The system of claim 14, wherein the cache LUN is based on storage space at a local solid state storage device that is managed by the adapter.

18. The system of claim 14, wherein the adapter maintains a bitmap for tracking blocks associated with the LBA range that may have been written or modified.

19. The system of claim 14, wherein the blocks associated with the LBA range are not read if the blocks have not been written to or modified.

20. The system of claim 14, wherein LBA range for the read ahead operation is greater than an LBA range of the read request.

21. The system of claim 14, wherein the entire LBA range is read ahead if any block within the LBA range has been written to or modified.

\* \* \* \* \*